United States Patent
Lapsley et al.

(10) Patent No.: US 9,165,323 B1
(45) Date of Patent: *Oct. 20, 2015

(54) BIOMETRIC TRANSACTION SYSTEM AND METHOD

(71) Applicants: Philip D. Lapsley, Oakland, CA (US); Philip J. Gioia, Corte Madera, CA (US); Michael Kleeman, Mill Valley, CA (US); Tennille V. Goff, Springfield, VA (US); Daniel J. Corwin, Canonsburg, PA (US)

(72) Inventors: Philip D. Lapsley, Oakland, CA (US); Philip J. Gioia, Corte Madera, CA (US); Michael Kleeman, Mill Valley, CA (US); Tennille V. Goff, Springfield, VA (US); Daniel J. Corwin, Canonsburg, PA (US)

(73) Assignee: Open Innovation Network, LLC, Durham, NC (US)

( * ) Notice: Subject to any disclaimer, the term of this patent is extended or adjusted under 35 U.S.C. 154(b) by 114 days.

This patent is subject to a terminal disclaimer.

(21) Appl. No.: 13/709,418

(22) Filed: Dec. 10, 2012

Related U.S. Application Data

(60) Continuation-in-part of application No. 13/587,708, filed on Aug. 16, 2012, now Pat. No. 8,630,932, which (Continued)

(51) Int. Cl.
*G06Q 40/00* (2012.01)
*G06Q 20/34* (2012.01)
(Continued)

(52) U.S. Cl.
CPC ............... *G06Q 40/00* (2013.01); *G06F 21/32* (2013.01); *G06Q 20/04* (2013.01); *G06Q 20/341* (2013.01); *G07C 9/00087* (2013.01); *G07C 9/00158* (2013.01)

(58) Field of Classification Search
USPC ............ 705/3, 44, 67, 75, 76; 702/104; 713/186; 715/811; 726/31; 379/145; 382/100, 115, 126; 340/426.19; 380/258; 235/492; 435/5

See application file for complete search history.

(56) References Cited

U.S. PATENT DOCUMENTS 3,639,905 A 2/1972 Yaida et al.
3,876,864 A 4/1975 Clark et al.
(Continued)

FOREIGN PATENT DOCUMENTS

EP 0581421 A1 2/1994
EP 0598469 A2 5/1994
(Continued)

OTHER PUBLICATIONS

Anderson, Teresa, et al., "Security Works," Security Management, v. 27, No. 11, Nov. 1993, pp. 17-19.
(Continued)

*Primary Examiner* — James Trammell
*Assistant Examiner* — Sanjeev Malhotra
(74) *Attorney, Agent, or Firm* — Haynes and Boone, LLP

(57) ABSTRACT

A system for enabling identity verification of an individual in a transaction between the individual and an entity that utilizes a data processing system, an entity device, and an individual device. The individual registers with the data processing system biometric data taken from the individual and data pertaining to an individual device. The entity registers with the data processing system entity identifying information. Once the individual and entity agree on a transaction, the entity notifies the data processing system of the pending transaction and requests verification of the individual's identity. The individual communicates to the data processing system individual biometric data. The data processing system compares the biometric data from the individual with registered biometric data. The data processing system forwards a result of the comparison to the entity and upon a successful comparison, may forward any requested information regarding the individual to the entity.

16 Claims, 2 Drawing Sheets

Related U.S. Application Data is a continuation of application No. 12/423,628, filed on Apr. 14, 2009, now Pat. No. 7,970,678, which is a division of application No. 09/871,241, filed on May 30, 2001, now Pat. No. 7,565,329.

(60) Provisional application No. 60/208,680, filed on May 31, 2000.

(51) Int. Cl.
*G06Q 20/04* (2012.01)
*G06F 21/32* (2013.01)
*G07C 9/00* (2006.01)

(56) References Cited

U.S. PATENT DOCUMENTS

| | | |
|---|---|---|
| 3,943,335 A | 3/1976 | Kinker et al. |
| 3,975,711 A | 8/1976 | McMahon |
| 4,048,618 A | 9/1977 | Hendry |
| 4,151,512 A | 4/1979 | Riganati et al. |
| 4,208,651 A | 6/1980 | McMahon |
| 4,213,038 A | 7/1980 | Silverman et al. |
| 4,227,805 A | 10/1980 | Schiller |
| 4,253,086 A | 2/1981 | Szwarcbier |
| 4,321,672 A | 3/1982 | Braun et al. |
| 4,322,163 A | 3/1982 | Schiller |
| 4,353,056 A | 10/1982 | Tsikos |
| 4,358,677 A | 11/1982 | Ruell et al. |
| 4,390,968 A | 6/1983 | Hennessy et al. |
| 4,429,413 A | 1/1984 | Edwards |
| 4,484,328 A | 11/1984 | Schlafly |
| 4,537,484 A | 8/1985 | Fowler et al. |
| 4,544,267 A | 10/1985 | Schiller |
| 4,582,985 A | 4/1986 | Lofberg |
| 4,618,988 A | 10/1986 | Schiller |
| 4,649,563 A | 3/1987 | Riskin |
| 4,675,815 A | 6/1987 | Kuroki et al. |
| 4,696,046 A | 9/1987 | Schiller |
| 4,699,149 A | 10/1987 | Rice |
| 4,720,869 A | 1/1988 | Wadia |
| 4,728,186 A | 3/1988 | Eguchi et al. |
| 4,734,858 A | 3/1988 | Schlafly |
| 4,747,050 A | 5/1988 | Brachtl et al. |
| 4,752,966 A | 6/1988 | Schiller |
| D298,536 S | 11/1988 | Brefka |
| 4,784,484 A | 11/1988 | Jensen |
| 4,790,564 A | 12/1988 | Larcher et al. |
| 4,799,156 A | 1/1989 | Shavit et al. |
| 4,805,223 A | 2/1989 | Denyer |
| 4,821,118 A | 4/1989 | Lafreniere |
| 4,837,422 A | 6/1989 | Dethloff et al. |
| 4,845,636 A | 7/1989 | Walker |
| 4,868,376 A | 9/1989 | Lessin et al. |
| 4,926,480 A | 5/1990 | Chaum |
| 4,946,276 A | 8/1990 | Chilcott |
| 4,947,028 A | 8/1990 | Gorog |
| 4,947,443 A | 8/1990 | Costello |
| 4,961,142 A | 10/1990 | Elliott et al. |
| 4,993,068 A | 2/1991 | Piosenka et al. |
| 4,995,086 A | 2/1991 | Lilley et al. |
| 4,998,279 A | 3/1991 | Weiss |
| 5,025,372 A | 6/1991 | Burton |
| 5,036,461 A | 7/1991 | Elliott et al. |
| 5,054,089 A | 10/1991 | Uchida et al. |
| 5,054,090 A | 10/1991 | Knight et al. |
| 5,056,019 A | 10/1991 | Schultz et al. |
| 5,073,950 A | 12/1991 | Colbert et al. |
| 5,077,803 A | 12/1991 | Kato et al. |
| 5,088,817 A | 2/1992 | Igaki et al. |
| 5,095,194 A | 3/1992 | Barbanell |
| 5,103,486 A | 4/1992 | Grippi |
| 5,105,467 A | 4/1992 | Kim et al. |
| 5,109,427 A | 4/1992 | Yang |
| 5,109,428 A | 4/1992 | Igaki et al. |
| 5,144,680 A | 9/1992 | Kobayashi et al. |
| 5,146,102 A | 9/1992 | Higuchi et al. |
| 5,161,204 A | 11/1992 | Hutcheson et al. |
| 5,168,520 A | 12/1992 | Weiss |
| 5,180,901 A | 1/1993 | Hiramatsu |
| 5,191,611 A | 3/1993 | Lang |
| 5,210,588 A | 5/1993 | Lee |
| 5,210,797 A | 5/1993 | Usui et al. |
| 5,222,152 A | 6/1993 | Fishbine et al. |
| 5,224,164 A | 6/1993 | Eisner |
| 5,224,173 A | 6/1993 | Kuhns et al. |
| 5,229,764 A | 7/1993 | Matchett et al. |
| 5,230,025 A | 7/1993 | Fishbine et al. |
| 5,239,583 A | 8/1993 | Parrillo |
| 5,241,606 A | 8/1993 | Horie |
| 5,251,259 A | 10/1993 | Mosley |
| D340,919 S | 11/1993 | Lee |
| 5,265,162 A | 11/1993 | Bush et al. |
| 5,267,324 A | 11/1993 | Kumagai |
| 5,274,695 A | 12/1993 | Green |
| 5,276,314 A | 1/1994 | Martino et al. |
| 5,280,527 A | 1/1994 | Gullman et al. |
| 5,280,627 A | 1/1994 | Flaherty et al. |
| 5,321,242 A | 6/1994 | Heath, Jr. |
| 5,321,765 A | 6/1994 | Costello |
| 5,325,442 A | 6/1994 | Knapp |
| 5,329,589 A | 7/1994 | Fraser et al. |
| 5,335,288 A | 8/1994 | Faulkner |
| 5,343,529 A | 8/1994 | Goldfine et al. |
| 5,351,303 A | 9/1994 | Willmore |
| 5,354,974 A | 10/1994 | Eisenberg |
| 5,359,669 A | 10/1994 | Shanley |
| 5,371,794 A | 12/1994 | Diffie et al. |
| 5,371,797 A | 12/1994 | Bocinsly, Jr. |
| 5,383,113 A | 1/1995 | Kight et al. |
| 5,386,104 A | 1/1995 | Sime |
| 5,400,662 A | 3/1995 | Tamori |
| 5,412,738 A | 5/1995 | Brunelli et al. |
| 5,416,573 A | 5/1995 | Sartor, Jr. |
| 5,429,006 A | 7/1995 | Tamori |
| 5,457,747 A | 10/1995 | Drexler |
| 5,465,290 A | 11/1995 | Hampton et al. |
| 5,465,303 A | 11/1995 | Levison et al. |
| 5,466,919 A | 11/1995 | Havakimian |
| 5,469,506 A | 11/1995 | Berson et al. |
| 5,484,988 A | 1/1996 | Hills et al. |
| 5,485,510 A * | 1/1996 | Colbert ........................ 379/145 |
| D367,044 S | 2/1996 | Arakaki |
| 5,493,621 A | 2/1996 | Matsumura |
| 5,499,288 A | 3/1996 | Hunt et al. |
| 5,513,272 A | 4/1996 | Bogosian, Jr. |
| 5,517,558 A | 5/1996 | Schalk |
| 5,533,123 A | 7/1996 | Force et al. |
| 5,534,855 A | 7/1996 | Shockley et al. |
| 5,546,471 A | 8/1996 | Merjanian |
| 5,546,523 A * | 8/1996 | Gatto ........................ 715/811 |
| 5,561,718 A | 10/1996 | Trew et al. |
| 5,572,597 A | 11/1996 | Chang et al. |
| 5,577,120 A | 11/1996 | Penzias |
| 5,578,808 A | 11/1996 | Taylor |
| 5,594,806 A | 1/1997 | Colbert |
| 5,598,474 A * | 1/1997 | Johnson ........................ 713/186 |
| 5,602,933 A | 2/1997 | Blackwell et al. |
| 5,604,802 A | 2/1997 | Holloway |
| 5,613,012 A | 3/1997 | Hoffman et al. |
| 5,615,277 A * | 3/1997 | Hoffman ........................ 382/115 |
| 5,621,812 A | 4/1997 | Deaton et al. |
| 5,635,723 A | 6/1997 | Fujieda et al. |
| 5,636,038 A | 6/1997 | Lynt et al. |
| 5,636,282 A | 6/1997 | Holmquist et al. |
| 5,647,364 A | 7/1997 | Schneider et al. |
| 5,650,217 A | 7/1997 | Skrivanek et al. |
| 5,655,116 A | 8/1997 | Kirk et al. |
| 5,677,989 A | 10/1997 | Rabin et al. |
| 5,719,950 A * | 2/1998 | Osten et al. ........................ 382/115 |
| 5,745,555 A | 4/1998 | Mark |
| 5,748,780 A | 5/1998 | Stolfo |
| 5,757,917 A | 5/1998 | Rose et al. |
| 5,764,789 A | 6/1998 | Pare, Jr. et al. |

(56) References Cited

U.S. PATENT DOCUMENTS

| | | | |
|---|---|---|---|
| 5,768,134 A | 6/1998 | Swaelens et al. | |
| 5,770,849 A * | 6/1998 | Novis et al. | 235/492 |
| 5,787,187 A | 7/1998 | Bouchard et al. | |
| 5,790,668 A | 8/1998 | Tomko | |
| 5,794,207 A | 8/1998 | Walker et al. | |
| 5,796,857 A | 8/1998 | Hara | |
| 5,799,156 A | 8/1998 | Hogan et al. | |
| D397,682 S | 9/1998 | Yotukura | |
| 5,802,199 A | 9/1998 | Pare, Jr. et al. | |
| 5,805,719 A | 9/1998 | Pare, Jr. et al. | |
| 5,805,802 A * | 9/1998 | Marx | 726/31 |
| D400,191 S | 10/1998 | Butts et al. | |
| 5,822,737 A | 10/1998 | Ogram | |
| 5,825,907 A | 10/1998 | Russo | |
| 5,825,924 A | 10/1998 | Kobayashi | |
| 5,826,241 A | 10/1998 | Stein et al. | |
| 5,826,245 A | 10/1998 | Sandberg-Diment | |
| 5,832,464 A | 11/1998 | Houvener et al. | |
| 5,838,812 A | 11/1998 | Pare, Jr. et al. | |
| 5,844,287 A | 12/1998 | Hassan et al. | |
| 5,845,005 A | 12/1998 | Setlak et al. | |
| 5,848,400 A | 12/1998 | Chang | |
| 5,850,442 A | 12/1998 | Muftic | |
| 5,870,723 A | 2/1999 | Pare, Jr. et al. | |
| 5,876,926 A * | 3/1999 | Beecham | 435/5 |
| 5,892,824 A | 4/1999 | Beatson et al. | |
| 5,892,838 A | 4/1999 | Brady | |
| 5,910,988 A * | 6/1999 | Ballard | 705/75 |
| 5,926,555 A | 7/1999 | Ort et al. | |
| 5,930,804 A | 7/1999 | Yu et al. | |
| 5,933,515 A | 8/1999 | Pu | |
| 5,935,071 A | 8/1999 | Schneider et al. | |
| 5,943,235 A | 8/1999 | Earl et al. | |
| 5,943,423 A * | 8/1999 | Muftic | 705/67 |
| 5,956,700 A | 9/1999 | Landry | |
| 5,982,914 A | 11/1999 | Lee et al. | |
| 5,986,746 A | 11/1999 | Metz et al. | |
| 5,991,372 A | 11/1999 | D'Ingianni et al. | |
| 6,011,858 A | 1/2000 | Stock et al. | |
| 6,012,039 A | 1/2000 | Hoffman et al. | |
| 6,016,476 A | 1/2000 | Maes et al. | |
| 6,023,688 A | 2/2000 | Ramachandran et al. | |
| 6,028,950 A * | 2/2000 | Merjanian | 382/126 |
| 6,029,195 A | 2/2000 | Herz | |
| 6,040,783 A | 3/2000 | Houvener et al. | |
| 6,041,309 A | 3/2000 | Laor | |
| 6,045,039 A | 4/2000 | Stinson et al. | |
| 6,052,675 A | 4/2000 | Checchio | |
| 6,064,751 A | 5/2000 | Smithies et al. | |
| 6,070,141 A * | 5/2000 | Houvener et al. | 705/76 |
| 6,072,894 A | 6/2000 | Payne | |
| 6,073,840 A | 6/2000 | Marion | |
| 6,084,967 A | 7/2000 | Kennedy et al. | |
| 6,105,010 A | 8/2000 | Musgrave | |
| 6,111,977 A | 8/2000 | Scott et al. | |
| 6,119,096 A | 9/2000 | Mann et al. | |
| 6,154,727 A * | 11/2000 | Karp et al. | 705/3 |
| 6,154,879 A | 11/2000 | Pare, Jr. et al. | |
| 6,182,076 B1 | 1/2001 | Yu et al. | |
| 6,192,142 B1 | 2/2001 | Pare, Jr. et al. | |
| 6,202,151 B1 | 3/2001 | Musgrave et al. | |
| 6,208,746 B1 * | 3/2001 | Musgrave | 382/100 |
| 6,219,439 B1 * | 4/2001 | Burger | 382/115 |
| 6,225,890 B1 * | 5/2001 | Murphy | 340/426.19 |
| 6,230,148 B1 | 5/2001 | Pare, Jr. et al. | |
| 6,233,565 B1 | 5/2001 | Lewis et al. | |
| 6,233,618 B1 | 5/2001 | Shannon | |
| 6,256,737 B1 | 7/2001 | Bianco et al. | |
| 6,260,024 B1 | 7/2001 | Shkedy | |
| 6,268,788 B1 | 7/2001 | Gray | |
| 6,269,348 B1 | 7/2001 | Pare, Jr. et al. | |
| 6,275,944 B1 | 8/2001 | Kao et al. | |
| 6,310,966 B1 | 10/2001 | Dulude et al. | |
| 6,311,272 B1 | 10/2001 | Gressel | |
| 6,317,834 B1 * | 11/2001 | Gennaro et al. | 713/186 |
| 6,327,578 B1 | 12/2001 | Linehan | |
| 6,366,682 B1 | 4/2002 | Hoffman | |
| 6,377,228 B1 | 4/2002 | Jenkin et al. | |
| 6,397,198 B1 | 5/2002 | Hoffman et al. | |
| 6,411,728 B1 | 6/2002 | Lee et al. | |
| 6,496,107 B1 | 12/2002 | Himmelstein | |
| 6,522,772 B1 | 2/2003 | Morrison et al. | |
| 6,928,546 B1 * | 8/2005 | Nanavati et al. | 713/186 |
| 7,133,792 B2 * | 11/2006 | Murakami et al. | 702/104 |
| 7,152,787 B2 | 12/2006 | Cheng | |
| 2001/0000045 A1 | 3/2001 | Yu et al. | |
| 2001/0000535 A1 | 4/2001 | Lapsley et al. | |
| 2001/0011247 A1 | 8/2001 | O'Flaherty et al. | |
| 2001/0033661 A1 * | 10/2001 | Prokoski | 380/258 |
| 2001/0034837 A1 | 10/2001 | Kausik et al. | |
| 2001/0044775 A1 | 11/2001 | Saito et al. | |
| 2001/0051924 A1 * | 12/2001 | Uberti | 705/44 |
| 2003/0061172 A1 | 3/2003 | Robinson | |

FOREIGN PATENT DOCUMENTS

| | | |
|---|---|---|
| EP | 0651357 A1 | 5/1995 |
| EP | 0823701 A2 | 2/1998 |
| EP | 0652540 B1 | 9/2000 |
| JP | 57-212851 | 12/1982 |
| JP | 59-368860 | 2/1984 |
| JP | 61-187838 | 8/1986 |
| JP | 63-003369 | 1/1988 |
| JP | 63-120385 | 5/1988 |
| JP | 63-261492 | 10/1988 |
| JP | 03-189756 | 8/1991 |
| JP | 03-288954 | 12/1991 |
| JP | 04-322382 | 11/1992 |
| JP | 04-324583 | 11/1992 |
| JP | 05-062057 | 3/1993 |
| JP | 05-250524 | 9/1993 |
| JP | 06-149980 | 5/1994 |
| JP | 06-176135 | 6/1994 |
| JP | 11-003382 | 1/1999 |
| JP | 11-039540 | 2/1999 |
| JP | 11-154260 | 6/1999 |
| WO | WO 94/10659 A1 | 5/1994 |
| WO | WO 95/13591 A1 | 5/1995 |
| WO | WO 98/09227 A1 | 3/1998 |
| WO | WO 98/23062 A1 | 5/1998 |
| WO | WO 98/25227 A1 | 6/1998 |
| WO | WO 98/50875 A2 | 11/1998 |
| WO | WO 99/28847 A1 | 6/1999 |

OTHER PUBLICATIONS

Anonymous, "A Credit Union Points a Finger at Biometrics," Bank Network News, vol. 15, No. 16, Jan. 13, 1997, p. 2.

Anonymous, "Is it Time for Biometrics?", Banking Automation Bulletin for Europe, London, Sep. 1992, Issue 115, (ProQuest document ID 7415352), 1 page.

"Biometric ID Cards," store from Totse.com, Feb. 1996, 10 pages.

"Biometric Payment Firm Pay by Touch Secures $10 Million Funding," Finextra.com, Oct. 2003, 3 pages.

"Biometrics Comparison Chart," ncsc.dni.us, 2002, 2 pages.

Cavoukian, Ann, "Consumer Biometric Applications: A Discussion Paper," Information and Privacy Commissioner, Ontario, Canada, Sep. 1999, 65 pages.

Cavoukian, Ann, "Go Beyond Security-Build in Privacy: One Does Not Equal the Other," CardTec/SecurTech 96 Conference, Atlanta, GA, May 14-16, 1996, 7 pages.

Hall, Joseph, "Scanning Lets Fingerprints do Talking Scrambled Image Ensures Privacy Developer Says," Toronto Star, May 15, 1997, p. A6.

Holmes, James P., et al., "A Performance Evaluation of Biometric Identification Devices," Sandia National Laboratories, Jun. 1991, 27 pages.

Kolor, Joanna, "Biometric Technology Goes Live," Bank Network News, May 1, 1996, 7 pages.

Lange, et al., "Digital Identification: Its Now at our Fingertips," Electronic Engineering Times, No. 946, Mar. 24, 1997, p. 142.

(56) References Cited

OTHER PUBLICATIONS

"Pay by Touch Announces First UK Customer," Pay by Touch Press Release, May 11, 2004, 2 pages.

Radcliff, Deborah, "When Data Warehouse Become Open Houses," Software Magazine, vol. 16, No. 11, Nov. 26, 1996, 2pages.

"Recently Granted Patents in the USA," Transponder News, Sep. 1998, 5 pages.

Rechtin, Mark, "Fingerprint Technology Makes for Best ID System," Orange County Business Journal, vol. 22, Issue 51, Section 1, May 14, 1990, 3 pages (ProQuest Document ID 6020297).

Scally, Robert, "CompUSA Tests Fingerprinting to Help Secure Transactions," Discount Store News, vol. 36, No. 10, May 19, 1997, 2 page.

Stosz, Jonathan D., et al., "Automated System for Fingerprint Authentication Using Pores and Ridge Structure," Proceedings of the International Society for Optical Engineering, vol. 2277, Jul. 28-29, 1994, pp. 210-223.

"Supermarkets and Shopper Registration Guide," Nocards.org, printed on Dec. 26, 2007, 19 pages.

"TCP Protocol Overview," printed on Dec. 26, 2007, 3 pages.

"Veridicom Showcases New Customers and Applications at COMDEX," Veridicom Press Release, Nov. 16, 1998, 3 pages.

"What Are Food Stamps?", Virginia Department of Social Services, Nov. 10, 2005, 1 page.

"Why do you call them "registration and monitoring" programs?", Frequently Asked Questions, Nocards.org, printed on Feb. 26, 2007, 1 page.

\* cited by examiner

BIOMETRIC TRANSACTION SYSTEM AND METHOD

CROSS-REFERENCE TO RELATED APPLICATION

This application is a continuation-in-part of co-pending U.S. application Ser. No. 13/587,708, filed Aug. 16, 2012, which is a continuation of U.S. application Ser. No. 12/423, 628, filed Apr. 4, 2009, now U.S. Pat. No. 7,970,678, which is a division of U.S. application Ser. No. 09/871,241, filed May 30, 2001, now U.S. Pat. No. 7,565,329, which claims the benefit of U.S. provisional application Ser. No. 60/208,680, filed May 31, 2000, herein incorporated by reference.

FIELD OF THE INVENTION

This invention relates to the field of biometric authentication. Specifically, this invention is directed towards a system and method for biometric authentication of individual biometric data for the purposes of verifying that individual's identity in a transaction using a wired or wireless communication system and portable or static devices such as a telephone (wired or wireless), a personal digital assistant (PDA), a computer (tablet, laptop, or desktop) or a similar device, wherein a biometric, such as a finger image or voice print, is used.

BACKGROUND OF THE INVENTION

There is an increasing need for individuals to be able to conveniently and securely verify their identities via biometric authentication for various types of transactions with entities.

Conventionally, in a biometric authentication system, individuals must present their biometric data to an entity via an entity device. The entity device then communicates with a data processing system to affect biometric data matching of the presented biometric data to registered biometric data to determine if individuals presenting the biometric data are who they claim to be. However, for some individuals, presenting biometric data via an entity device has proven a transaction deterrent, as they may question the security of entering such personal data into the entity device.

There are numerous problems with this conventional approach. First, the conventional approach is often uncomfortable for the individual to use, as he must enter a significant amount of personal data into an entity device, thereby trusting the entity with his highly personal data. Second, this approach requires that an entity invest in a biometric device that it may not use often and must incorporate somewhere near a point of transaction where it inevitably monopolizes valuable space. Third, this approach is inflexible in that it requires that the individual and entity be co-located in order to affect a transaction. Fourth, in the case of a financial, token-based transaction, those made without a card being physically present (as in the case of a telephone or Internet order) are charged a higher "discount rate" than transactions where the card is present. The discount rate is the amount that the credit card associations, issuing banks, acquiring banks, and third-party transaction processors collectively charge the entity (e.g., merchant) on each transaction, generally expressed as a percentage of the gross transaction amount. Discount rates of 3%-5% for card-not-present transactions are common.

As a result, there is a need for a system that solves these problems. Accordingly, it is an object of this invention to provide a new biometric authentication system and method for facilitating identity verification of individuals conducting transactions that allows an individual to utilize an individual device to enter sensitive biometric data into the system.

Biometric authentication systems are known in the art; examples include U.S. Pat. No. 5,613,012 to Hoffman et al., U.S. Pat. No. 5,838,812 to Pare, Jr. et al., U.S. Pat. No. 5,870,723 to Pare, Jr. et al., U.S. Pat. No. 6,230,148 to Pare, Jr. et al., U.S. Pat. No. 6,154,879 to Pare, Jr. et al., U.S. Pat. No. 7,613,659 to Hoffman, et al., U.S. Pat. No. 7,512,567 to Bemmel, et al., and U.S. Pat. No. 7,269,737 to Robinson, all of which are incorporated by reference.

In particular, it is an object of the invention that an individual be enabled to use an individual device to facilitate verification of his identity in a variety of transactions.

It is another object of the invention that the system and method are secure, eliminating the possibility of fraud via intercepting transmissions from the individual device.

It is another object of the invention that the system and method provide the flexibility of supporting multiple types of individual and entity devices.

It is still another object of the invention that it be easy to integrate the present invention with existing entity computer, information, and transaction systems.

SUMMARY OF THE INVENTION

This invention provides a method for biometric identity verification of an individual in a transaction between the individual and an entity using an electronic data processing system (DPS), an individual device, and an entity device. A transaction may comprise any number of communicative interactions between two parties, e.g., an entity and an individual, in which the identity of one or more of the parties must be verified. Examples of such transactions include financial transactions, age verifications, identity verifications, ticket redemptions, incentive transactions, peer-to-peer payments, peer-to-peer privilege transfers, physical access requests, virtual access requests, or the like. To utilize the system, an individual registers with the DPS biometric data and an individual device code (ID code) that is associated with an individual or individual device. The biometric data may be taken directly from the individual's person, from a token, from a data store, or a combination thereof. The ID code may be any code that can be used to identify or assist in identifying the individual or individual device. In a transaction, the individual and entity establish communications with each other. Such communications may be face-to-face or via communication of individual and entity devices or any other method. The individual device may communicate to the entity its associated ID code, which the entity may forward to the DPS. The individual and the DPS may then use the ID code to establish communications. The individual device may communicate the ID code to the DPS, which may utilize it to verify the ID code received from the entity and utilize it to determine registration biometric data to compare with biometric data taken directly from the individual's person to produce a successful or failed identification of the individual. Upon successful comparison of biometric data, the DPS may verify the individual's identity to the entity. The DPS may additionally forward individual data registered with the DPS to the entity upon a successful comparison of biometric data. Such data may include, for example, the individual's age, name, address, or any other data that the individual has registered with the DPS.

The foregoing and other objects, features, and advantages of the invention will become more readily apparent from the

DETAILED DESCRIPTION

Overall Architecture

Figure 1:
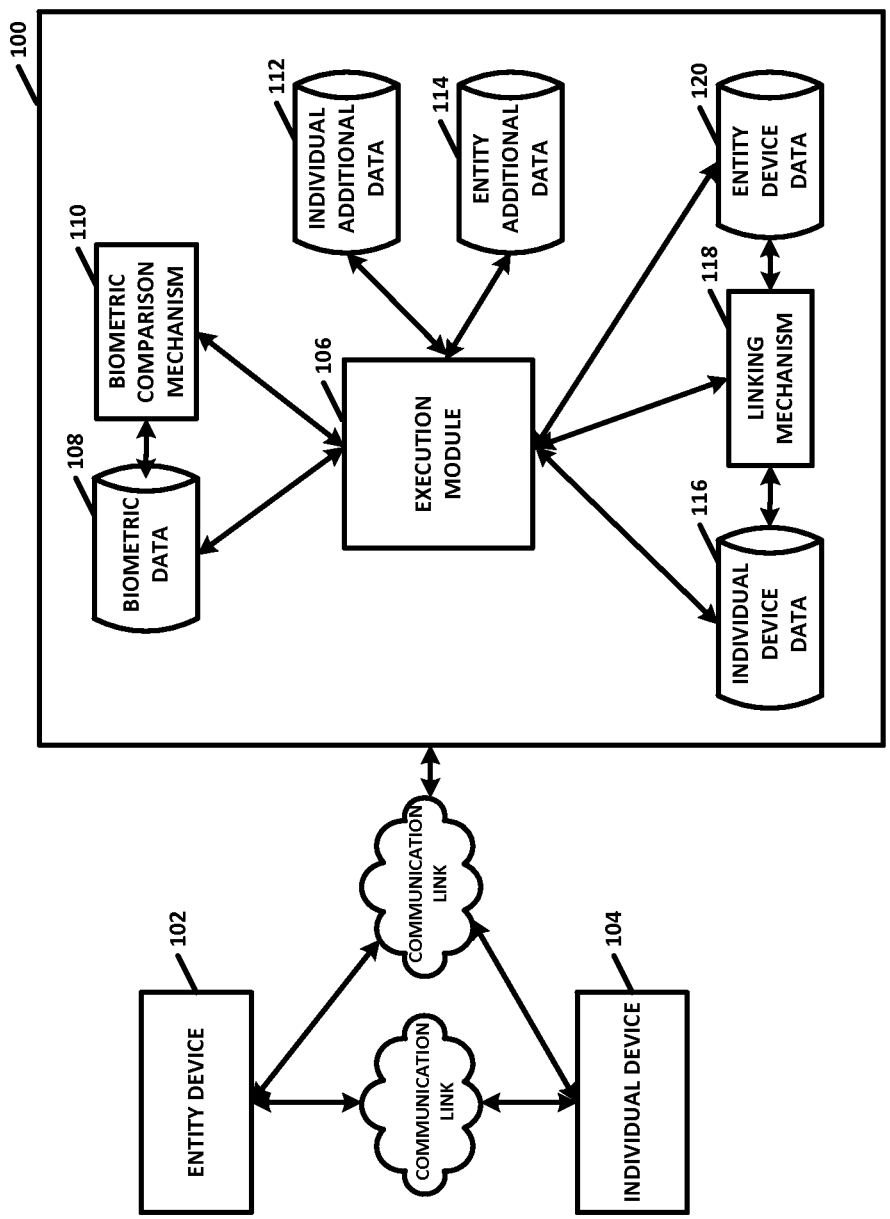
FIG. 1 shows the overall collection of elements comprising the system.

As shown in FIG. 1, the invention comprises DPS 100, which is capable of communicating with individual device 104 and entity device 102. An individual may use DPS 100 to verify one or more aspects of his identity. Similarly, an entity may use DPS 100 to obtain verification of one or more aspects of the individual's identity. The individual has access to individual device 104. As described in greater detail below, individual device 104 may be a device that is at least capable of communicating with DPS 100 and accepting biometric data from the individual. Individual device 104 may additionally be capable of communicating directly with entity device 102. Biometric data may be any unique human characteristic of which a scan or image is taken directly from the person and may be, but is not limited to, a voice print, a fingerprint, a retinal image, an iris image, a facial image, an electronic representation of the above, such as a template, or the like.

DPS 100 may provide the ability to accept data pertaining to the individual (e.g., biometric and other data), to identify the individual from this data, to verify the identity of the individual to an entity, and to provide the entity with individual data upon request. It is understood that DPS 100 may be owned and/or operated by the entity, the individual, or a third party.

DPS 100 may be a single computer or a collection of computers and may serve a particular entity or a number of different entities. Although only a single instance of each component is depicted, this is for illustrative purposes only and is not to be construed as limiting. Furthermore, although each component is depicted and described herein as separate, this is not to be construed as limiting, and components may be combined per implementation. For example, components of DPS 100 may be combined (e.g., biometric data and additional data may be stored in the same location).

Communication Links

Communication links may exist or may be established between individual device 104 and entity device 102, individual device 104 and DPS 100, and the entity device 102 and DPS 100. A communication link may be a permanent connection (e.g., a leased line), a temporary switched-circuit connection (e.g., a dialup telephone call), a network (e.g., cellular networks, the Internet, Wi-Fi, GPS, NFC, WAN, LAN, WLAN, WPAN, etc.), a virtual connection (e.g., via packet switching), or any other suitable connection. Encryption may be employed on all communication links to protect sensitive data, as is standard in the industry.

Individual Device

Individual device 104 is any device that is capable of communicating with DPS 100 and accepting a biometric sample from the individual. Individual device 104 may be a portable device, such as a wireless telephone, a two-way pager, a personal digital assistant (e.g., a smartphone), an Internet-enabled phone, a portable computer (e.g., a laptop, a tablet computer) or the like. Individual device 104 may alternatively be a static device, such as a wired telephone, a desktop computer, a kiosk, or the like. Individual device 104 may additionally be capable of communicating directly with entity device 102. Different individual devices may be preferable in different situations. In one embodiment, an individual may use a device such as a wireless telephone to call an entity and conduct a transaction. In such a case, individual device 104 may be used as a biometric input device utilizing the individual's voice as a biometric and the wireless telephone's microphone as a biometric reader. Individual device 104 may also be equipped with a finger image scanner or other biometric sensor, such as a camera for capturing facial data. Other individual devices will be apparent to those of ordinary skill in the art and the aforementioned examples are not to be construed as limiting.

Individual device 104 may be associated with an ID code. This ID code may be unique to individual device 104 but is not required to be. Examples of ID codes may include a digital certificate, a Subscriber Identity Module (SIM) code, a code for enabling short-range transmissions (e.g., Near Field Communications), a telephone number, an electronic serial number (ESN), a mobile identification number (MIN), a hardware identification code, an encryption of a challenge message using a private key, or the like. An ID code may also be a code that is not directly associated with the device but instead may be unique to an individual. Examples of such ID codes could include social security numbers, driver's license numbers, telephone numbers, birth dates, PIN codes, etc. Such an ID code may enable the individual to utilize any individual device 104, whether it is his device or a shared device. Communication of the ID code may be accomplished via caller identification, hand-keying, voice recognition, automated transmission, or the like, and communication between the entity and individual may be established via a telephone call, three-way calling, induced three-way calling, packet switching, a data exchange, a face-to-face interaction, text messaging, the Internet, a local area network (LAN), a personal area network (PAN), a wireless local network (WLAN), a wide area network (WAN), a wireless personal network (WPAN, e.g., Bluetooth), Near Field Communication (NFC), or the like.

Entity Device

Entity device 102 is any device that is capable of communicating with DPS 100. Entity device 102 may be a stand-alone device or a network of devices utilized to function as entity device 102. Entity device 102 may communicate with DPS 100 directly or via one or more communication networks. The "entity" may be an individual or institution with which the individual is interacting. For example, an entity may be a retailer, an airline or other travel entity, a government agency, or the like, or an entity may be an individual employed by such an institution or acting independently. Entity device 102 may additionally be capable of communicating with individual device 104 and/or of receiving entity biometric data. As with individual device 104, entity device 102 may be a portable or static device. Additional forms of entity device 102 may include a point of transaction station, such as a point-of-sale terminal, ticket redemption counter, a kiosk, an identification check point, a vending machine, or the like. In other embodiments, the entity may be another individual utilizing a second individual device to conduct a peer-to-peer transaction. In this scenario, the second individual device interacts with DPS 100 in a manner similar to that of entity device 102. Entity device 102 may also be associated with an entity identification (EID) code, which may help DPS 100 more easily identify the entity. This EID may be unique to entity device 102 but is not required to be. Examples of EID codes may include a digital certificate, a Subscriber Identity Module (SIM) code, a code for enabling short-range transmissions (e.g., Near Field Communications), a telephone number, an electronic serial number (ESN), a mobile identification number (MIN), a hardware identification code, an encryption of a challenge message using a private key, or the like. Communication of the EID code may be accomplished via caller identification, hand-keying, voice recognition, automated transmission, or the like, and communication between the entity and individual may be established via a telephone call, three-way calling, induced three-way calling, packet switching, a data exchange, a face-to-face interaction, text messaging, the Internet, a local area network (LAN), a personal area network (PAN), a wireless local network (WLAN), a wide area network (WAN), a wireless personal network (WPAN, e.g., Bluetooth), Near Field Communication (NFC), or the like.

Data Processing System (DPS)

DPS 100 may include a data and/or call-processing system comprising one or more of execution module 106; biometric comparison mechanism 110; linking mechanism 118; and data stores capable of storing identifying data, such as biometric data 108, individual additional data 112, entity additional data 114, individual device data 116, and entity device data 120. The inclusion of differing data stores is for illustrative purposes and is not to be considered limiting. Such data stores could also be combined and/or further segmented, depending on the embodiment of DPS 100. DPS 100 may be a single computer or a collection of computers and may serve a particular entity or a number of different entities.

Biometric data store 108 may store biometric data of individuals and entities registered to use DPS 100. Device data stores 116 and 120 may store an ID code and an EID code, respectively, and other data associated with individual device 104 and entity device 102. Additional data stores 112 and 114 may store individual and entity data other than biometric data and device data, such as identity information, location information, age information, contact information, financial account information, or the like. Biometric comparison mechanism 110 may compare biometric data received from individual device 104 and/or entity device 102 with registered biometric data stored in biometric data store 108.

DPS 100 may utilize ID codes or any other individual- or entity-specific data to reference and locate registered data. For example, an individual's registered biometric data and additional data may be stored in association with an ID code received from individual device 104. Alternatively, individual and/or entity data may be associated with a system identifier (SI) code. An SI code may reference the entirety of the individual's or entity's data stored within DPS 100. The SI code may be included in a registry to enable DPS 100 to index biometric data, additional data, and device data, or the like to better facilitate locating such data throughout DPS 100.

Execution module 106 may serve as the computing mechanism to affect communication within DPS 100, with entity device 102, with individual device 104, and may assist in the enablement of the transaction between the individual and the entity. Linking mechanism 118 may assist DPS 100 in linking data received from entity device 102 and individual device 104 in order to facilitate responding to entity requests. While DPS 100 is depicted as comprising biometric comparison mechanism 110, the system may also be structured to utilize a biometric comparison mechanism that may be present in individual device 104. For example, DPS 100 may communicate registered biometric data to individual device 104 to enable a biometric comparison mechanism residing on individual device 104 to compare to the registered biometric data with captured biometric data. An example of such a system configuration is further discussed in U.S. Pat. No. 7,269,737 to Robinson, which is herein incorporated by reference.

DPS 100 may accept queries including biometric data and utilize this data to identify individuals. Once an individual is identified, DPS 100 may retrieve data associated with that individual necessary for completion of a transaction. Such data may be requested by the entity or the individual and may be used to approve or disapprove a requested transaction. Such information may include an electronic copy of an identification document (e.g., a passport, a driver's license, a visa, etc.), information associated with one or more individual financial accounts, medical records, a yes/no answer to the query of whether or not the individual is a certain age, an indication of the individual's identity, or the like.

An example of a system such as DPS 100 is illustrated in U.S. Pat. No. 5,613,012 to Hoffman, et al., which is hereby incorporated by reference.

Use of DPS 100

An individual and an entity may wish to utilize DPS 100 to facilitate a transaction in which the entity seeks verification of the individual's identity. The individual and the entity establish a communication link to negotiate the details of the transaction. The manner of establishing this link may be, for example, via face-to-face interaction or device-to-device interaction. For example, the individual may use individual device 104 to contact entity device 102.

Once the individual and the entity have negotiated the details of the transaction via their established communication link, they may utilize DPS 100 to verify the identity of the individual. For example, the individual may wish to verify his identify to the entity, and the parties may utilize DPS 100 to facilitate biometric identity verification of the individual in order to do so.

Figure 2:
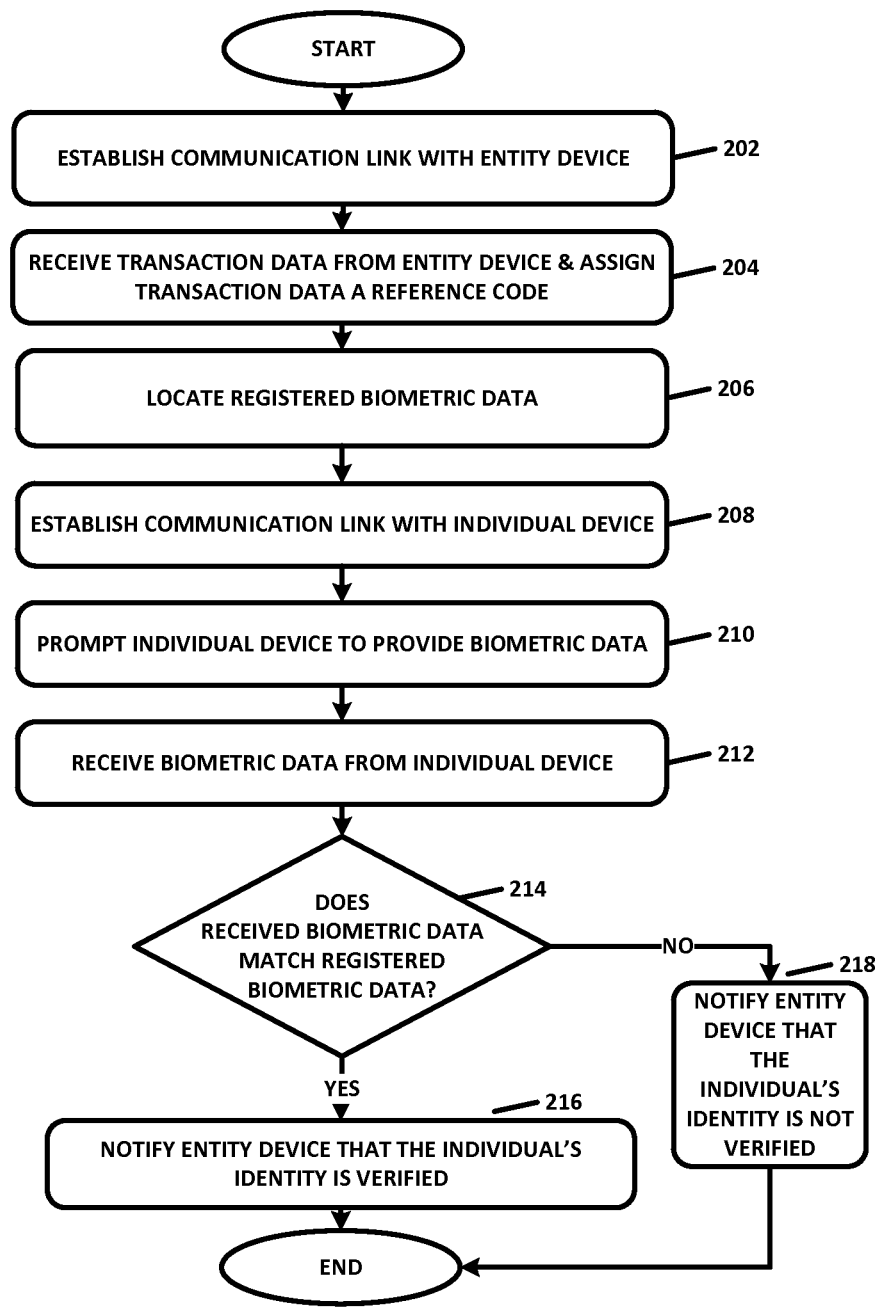
FIG. 2 illustrates an example operation of the system.

FIG. 2 shows an example method of verifying the identity of an individual via DPS 100. The method depicted may be implemented through the use of various embodiments of individual device 104.

At step 202, DPS 100 receives a communication link request, in which entity device 102 requests to establish a communication link with DPS 100. Once a communication link is established between DPS 100 and entity device 102, at step 204 execution module 106 receives a verification request, in which entity device 102 requests that DPS 100 verify the identity of an individual in a transaction. This verification request may include transaction data, such as an ID code that corresponds to an individual or an individual device 104, entity identifying information (e.g., an EID code associated with entity device 102, a name, an address, a location identifier, a telephone number, etc.), details of the transaction that the individual and entity have negotiated, or the like. In negotiating the details of the transaction, entity device 102 may have received the ID code from individual device 104 in various ways. For example, in a device-to-device embodiment, this may be accomplished via caller identification or another automated method. In a face-to-face embodiment, the individual may tell the entity his ID code, which the entity may then enter into entity device 102. Execution module 106 may receive the verification request from entity device 102 via an out-of-band channel (e.g., a separate network connection, via a virtual private network, etc.) or it may be passed in-band via the initiation of a connection.

Execution module 106 may forward the verification request to linking mechanism 118, where it may be assigned a reference code and held for use by DPS 100 to facilitate a request response to entity device 102. The reference code may provide DPS 100 with a way to track transaction data as it is utilized throughout DPS 100. The reference code may be a portion of the transaction data, such as the ID code, an entity identifier, or the like. Alternatively, execution module 106 may assign a system-generated reference code to the verification request. The reference code may be associated with any pertinent data as it is communicated internally or externally to aid with data processing.

In step 206, execution module 106 may utilize the received ID code to locate or to assist in locating registered biometric data stored in biometric data store 108. As mentioned, DPS 100 may be configured to associate registered biometric data with ID codes or with other identifiers. If registered biometric data is not associated directly with ID codes, the execution module may locate the registered biometric data via another identifier also referenced with the received ID code, such as an SI code.

In step 208, DPS 100 and individual device 104 may establish a communication link. This may be accomplished via execution module 106 utilizing the ID code to establish a connection with individual device 104. Alternatively, execution module 106 may search individual device data store 116 for associated device data it may use to contact individual device 104. In a further embodiment, if entity device 102 and individual device 104 have established a communication link, entity device 102 may transfer its communication link with DPS 100 to individual device 104 so that individual device 104 and DPS 100 may interact. And in yet an alternative embodiment, execution module 106 may await a communication link request from individual device 104. In an embodiment in which individual device 104 initiates communication with DPS 100, individual device 104 may identify itself to DPS 100 via presentment of its ID code. Execution module 106 may forward the ID code to linking mechanism 118 to retrieve necessary data to continue processing of the initial request received from entity device 102.

Once communication is established between DPS 100 and individual device 104, in step 210 execution module 106 may prompt individual device 104 to provide biometric data. Individual device 104 may, in turn, prompt the individual to input biometric data if he has not already done so. Depending on the configuration of individual device 104, biometric data may be a finger image, a voiceprint, or any other type of biometric.

In step 212, execution module 106 may receive biometric data from individual device 104 and forward the received biometric data to biometric comparison mechanism 110 where it may be compared to the registered biometric data that execution module 106 has identified as being associated with the ID code. The result of this comparison may be utilized to verify the individual's identity. In the event that the received biometric data does not sufficiently match the registered biometric data and the individual's identity cannot be verified, execution module 106 may prompt individual device 104 to obtain biometric data again. At step 218, if the individual's identity cannot be verified after repeated tries, execution module 106 may transfer the communication link to a human customer service assistant, who may use other means to identify the individual or suggest to the entity that the transaction be declined. If the biometric comparison is successful, execution module 106 may retrieve the associated transaction data held in linking mechanism 118. Execution module 106 may use this transaction data to either identify entity device 102, should it have retained its communication with DPS 100, or locate contact data for entity device 102 via use of entity device store 120, entity additional data store 114, and/or a combination of entity device store 120 and entity additional data store 114. Alternatively, the transaction data may include entity device 102 contact data. Once entity device 102 is identified and/or its contact data located, at step 216, execution module 106 may notify the entity that the individual's identity is verified. This notifying may include utilizing the located contact data to establish communications with entity device 102 again to do so. Alternatively, module 106 may retrieve and forward any additional individual data necessary for satisfying the verification request from individual additional data store 112, according to the details of the received transaction data. Such information may include a yes/no answer to the query of whether or not the individual is a certain age, an indication of the individual's identity, account information pertaining to a credit card or other financial account data, a copy of an individual identification document, or the like. Upon communication of identity verification, the communication link between DPS 100 and entity device 102 may be maintained in order for the entity to query DPS 100 via entity device 102. Such an embodiment may allow an entity to obtain further data about the individual that may have not be requested in the initial transaction data.

In an additional embodiment, at step 210, should individual device 104 be equipped to effect biometric comparisons, execution module 106 may forward the registered biometric data associated with individual device 104 with a prompt for individual device 104 to provide the result of a comparison of the registered biometric data to individual biometric data retrieved via individual device 104. Execution module 106 may receive the result of the individual device biometric comparison at step 212 and proceed to step 214 as illustrated.

In an alternate embodiment of FIG. 2, individual device 104 may additionally send biometric data to entity device 106 via the communication link initially established for negotiating the details of the transaction or via a subsequent communication link. In this embodiment, DPS 100 may receive biometric data of the individual via the verification request of step 204 (e.g., as included as transaction data) or via a subsequent communication link between DPS 100 and entity device 106. Such a scenario may enable DPS 100 to provide verification of the individual's identity directly to the entity via entity device 106 without the need for establishing a separate communication link with individual device 104.

In a further embodiment, individual device 104 may receive an entity identifier and details of the negotiated transaction via the initially established communication link for negotiating the details of the transaction, or via a subsequent communication link between the individual device 104 and the entity device 106. In such a scenario, steps 202 through 206 of FIG. 2 may be eliminated. In addition, DPS 100 may communicate with individual device 104 at step 216 and/or 218, and individual device 104 may communicate with entity device 106 to either confirm or deny identity verification.

In preferred embodiments, encryption and cryptographic authentication mechanisms may be used to maintain the security, integrity, and non-repudiation of information communicated between individual device 104, entity device 106, and DPS 100. Such encryption may include symmetric or "secret key" cryptosystems or public key cryptosystems, and such authentication mechanisms may include cryptographic message authentication codes, as are known in the industry.

From the foregoing it will be appreciated how the objects of the invention are met. As can be seen from the above, the invention is markedly advantageous over existing systems in numerous ways:

First, the invention is convenient for the individual, in that DPS 100 may handle all personal information, eliminating the need to recite or otherwise enter personal information into a static or portable device.

Second, the use of biometrics and encryption may provide security, eliminating the possibility of fraud via intercepting transmissions from the static or portable device.

Third, the system may support the use of multiple types of individual data, providing flexibility for the individual.

Fourth, by using ordinary telephone connections, existing wireless connections, Internet connections, or the like, the invention may easily integrate with existing computer, information, and payment systems.

Although the invention has been described with respect to particular transactions, it will be appreciated that various modifications of the system and method are possible without departing from the invention.

The invention claimed is:

1. A data processing system, the data processing system comprising:
   an entity device that establishes a communication link;
   wherein the entity device receives a request to verify the identity of an individual, wherein the request includes an individual device code that establishes a communication link with an individual device capable of biometric input;
   wherein the individual device is identified via the individual device code;
   wherein a communication link is established with the identified individual device wherein the individual is identified via biometric data;
   wherein the biometric data is received from the individual via the individual device;
   wherein individual registered biometric data associated with the individual device code is determined;
   wherein the received biometric data is compared with the determined registered biometric data to produce a successful or failed comparison;
   wherein via the established communication link with the entity device, the entity device is notified of a result of the comparison, wherein the result verifies or denies the identity of the individual; and
   wherein the individual device code is one or more of a digital certificate, a Subscriber Identity Module code, a code for enabling short-range transmissions, a telephone number, an Electronic Serial Number, a mobile identification number, a hardware identification code, and an encryption of a challenge message using a private key.

2. The data processing system of claim 1, wherein the individual has additionally registered with the data processing center one or more of a name, an address, and an age.

3. The data processing system of claim 1, wherein the individual device is one or more of a portable device and a static device.

4. The data processing system of claim 1, wherein the individual device code is communicated via one or more of caller identification, hand-keying, voice recognition, and automated transmission.

5. The data processing system of claim 1, wherein the communications are established via one or more of a telephone call, three-way calling, induced three-way calling, packet switching, a data exchange, a face-to-face interaction, text messaging, the Internet, a local area network (LAN), a personal area network, a wireless local network (WLAN), a wide area network (WAN), a wireless personal network (WPAN), and Near Field Communication (NFC).

6. The data processing system of claim 1, wherein the communication link is established with the individual device comprises one or more of the data processing system contacts the individual device or the individual device contacts the data processing system.

7. The data processing system of claim 1, further comprising a request received from the entity device to return individual data to the entity device after a successful identification of the individual.

8. The data processing system of claim 7, wherein the entity device utilizes the requested individual data to conduct a financial transaction, perform an age verification, perform an identity verification, grant the individual physical access to a restricted area, grant the individual virtual access to a restricted area, conduct a ticket redemption, conduct an incentive transaction, or authorize a peer-to-peer transfer privilege.

9. The data processing system of claim 1, wherein the entity device is used by a second individual.

10. The data processing system of claim 9, wherein the individual and the second individual utilize the data processing system to conduct a peer-to-peer transaction.

11. A data processing system, the data processing system comprising:
    an entity device;
    a communication link established with the entity device;
    wherein individual data stored in association with ID code is located, the individual data at least comprising biometric data and the ID code received via the established communication link with the entity device to verify the identity of the an individual;
    wherein the ID code to facilitate communications with an individual device is utilized;
    wherein an individual is prompted to present biometric data via the individual device;
    wherein the presented biometric data is received; and
    wherein, via the established communication link with the entity device, the identity of the individual to the entity device based on a successful match of received individual data to stored individual data is verified; and
    wherein the ID code is one or more of a digital certificate, a Subscriber Identity Module code, a code for enabling short-range transmissions, a telephone number, an Electronic Serial Number, a mobile identification number, a hardware identification code, and an encryption of a challenge message using a private key.

12. The data processing system, of claim 11, wherein the entity device is used by another individual.

13. The data processing system, of claim 11, wherein the individual device is one or more of a portable device and a static device.

14. A system comprising:
    one or more data stores that store data that one or more of an entity and an individual registers with a data processing system, the data at least comprising entity identifier data and entity device data and individual identifier data and individual device data, the individual identifier data including biometric data;
    a biometric comparison mechanism that compares biometric data;
    a linking mechanism that holds data that pertains to one or more of an entity request and an individual request; and
    an execution module that communicates with one or more of an entity device and an individual device and retrieves data registered with the data processing system based upon a prompt provided via one or more of the entity device and the individual device.

15. The system of claim 14, wherein one or more of the entity device and the individual device communicates with the data processing system via a wireless communication system.

16. The system of claim 14, wherein the biometric data comprises a voice print, a fingerprint, a retinal image, an iris image, and a facial image.

* * * * *